US010407600B2

(12) United States Patent
Núñez et al.

(10) Patent No.: US 10,407,600 B2
(45) Date of Patent: Sep. 10, 2019

(54) YEAST-BASED ADHESIVE EXTRACT, COMPOSITION AND METHOD

(71) Applicant: Universidad del Bio Bio, Concepcion (CL)

(72) Inventors: Mario A. Núñez, Concepcion (CL); Julio E. Alarcón, Concepcion (CL); Aldo A. Ballerini, Concepcion (CL)

(73) Assignee: UNIVERSIDAD DEL BIO BIO, Concepcion (CL)

( * ) Notice: Subject to any disclaimer, the term of this patent is extended or adjusted under 35 U.S.C. 154(b) by 0 days.

(21) Appl. No.: 15/763,035

(22) PCT Filed: Oct. 25, 2016

(86) PCT No.: PCT/CL2016/000065
§ 371 (c)(1),
(2) Date: Mar. 23, 2018

(87) PCT Pub. No.: WO2017/075725
PCT Pub. Date: May 11, 2017

(65) Prior Publication Data
US 2018/0291244 A1    Oct. 11, 2018

(30) Foreign Application Priority Data

Nov. 5, 2015 (CL) .................................. 3255-2015

(51) Int. Cl.
*C09J 189/00* (2006.01)
(52) U.S. Cl.
CPC .................................. *C09J 189/00* (2013.01)
(58) Field of Classification Search
None
See application file for complete search history.

(56) References Cited

U.S. PATENT DOCUMENTS

| 2,603,630 | A |   | 7/1952  | Aries |   |
|---|---|---|---|---|---|
| 5,091,399 | A | * | 2/1992  | Osei-Gyimah | C07D 417/12 514/367 |
| 7,651,582 | B2 |   | 1/2010  | Weimer |   |
| 2007/0135391 | A1 | * | 6/2007  | Huff | A01N 51/00 514/149 |
| 2010/0258033 | A1 |   | 10/2010 | Yang |   |
| 2015/0327550 | A1 | * | 11/2015 | Premachandran | A01N 43/80 514/373 |
| 2016/0198712 | A1 | * | 7/2016  | Gerharz | A01N 43/80 424/408 |

FOREIGN PATENT DOCUMENTS

| CL | 3255-2015 |   | 11/2015 |
|---|---|---|---|
| GB | 328645 |   | 1/1929 |
| RU | 245723 C1 |   | 6/2011 |
| RU | 2457232 | * | 7/2012 |
| WO | 2017075725 A1 |   | 10/2016 |

OTHER PUBLICATIONS

"Optimization of the conditions required for chemical and biological modification of the yeast waste from beer manufacturing". David Kadimaliev et al. (Year: 2012).*
"Evaluation of single cell protein from yeast for the development of wood adhesives" Mario Nunez Dea. et al. (Year: 2016).*
Athanassiadou E., Tsiantzi S., Markessini C. 2009. Producing Panels with Formaldehyde Emission at Wood Levels. Conference International Wood Adhesives, Sep. 28-30, 2009, Lake Tahoe, Nevada, USA.
Pizzi, A. 2006. Recent developments in eco-efficient bio-based adhesives for wood bonding: opportunities and issues. Journal of Adhesion Science and Technology, 20(8): 829-846.
Van Langenberg K., Gribsby W., Ryan G. 2010. Green Adhesives: Options for the Australian industry—summary of recent research into green adhesives from renewable materials and identification of those that are closest to commercial uptake. Forest & Wood Products Australia. Project No. PNB158-0910.
Huang J., Li K. 2008. A New Soy Flour-Based Adhesive for Making Interior Type II Plywood. In: J. Am. Oil Chem. Soc. 85: 63-70.
Lee H., Scherer N., Messersmith P. 2006. Single-Molecule Mechanics of Mussel Adhesion. In; Proc. Nat. Acad. Sci., 103(35): 12999-13003.
Liu Y., Li K. 2002. Chemical Modification of Soy Protein for Wood Adhesives. In: Macromol. Rapid Commun. 23 (13):739-742.
Wescott J., Birkeland M., Yavorksky J., Brady R. 2009. Recent advances in soy containing PB and MDF. Proceedings of the International Conference on Wood Adhesives 2009. Lake Tahoe, Nevada, USA, Sep. 28-30, 2009, Section 2B Composites, 136.
Westwood G., Horton T., Wilker J. 2007. Simplified Polymer Mimics of Cross-Linking Adhesive Proteins. In: Macromolecules, 40: 3960-3964.
Adedayo M., Ajiboye E.,Akintunde, J., Odaibo A. 2011. Single Cell Proteins: As Nutritional Enhancer. Advances in Applied Science Research 2(5):396-409.
Chacón A. 2004. Perspectivas actuales de la proteína unicelular (SCP) en la agricultura y en la industria. Agronomía Mesoamericana, 15(1): 93-106.
Dharumadurai D., Subramaniyan L., Subhasish S. 2011. Production of Single Cell Protein from Pineapple waste using yeast. Innovative Romanian Food Biotechnology, 8(3): 26-32.
Giraldo M., López P. 2008. Producción de proteína unicelular a partir de desechos agroindustriales. Revista VirtualPro, Bogotá Colombia, 82: 1-18.

(Continued)

*Primary Examiner* — Melvin C. Mayes
*Assistant Examiner* — Colette B Nguyen
(74) *Attorney, Agent, or Firm* — Allan Watts

(57) ABSTRACT

The invention relates to a yeast protein extract with adhesive properties, comprising extracts of *Rhodotorula rubra, Pichia pastoris* and *Sacharomyces cerevisiae*, which have been deposited. The invention also relates to an adhesive composition for wood panels, comprising the yeast protein extract in equal quantities. The invention further relates to a method for preparing the yeast protein extract. The composition can be used in wood panels.

11 Claims, 4 Drawing Sheets

(56) References Cited

OTHER PUBLICATIONS

Figure 1:
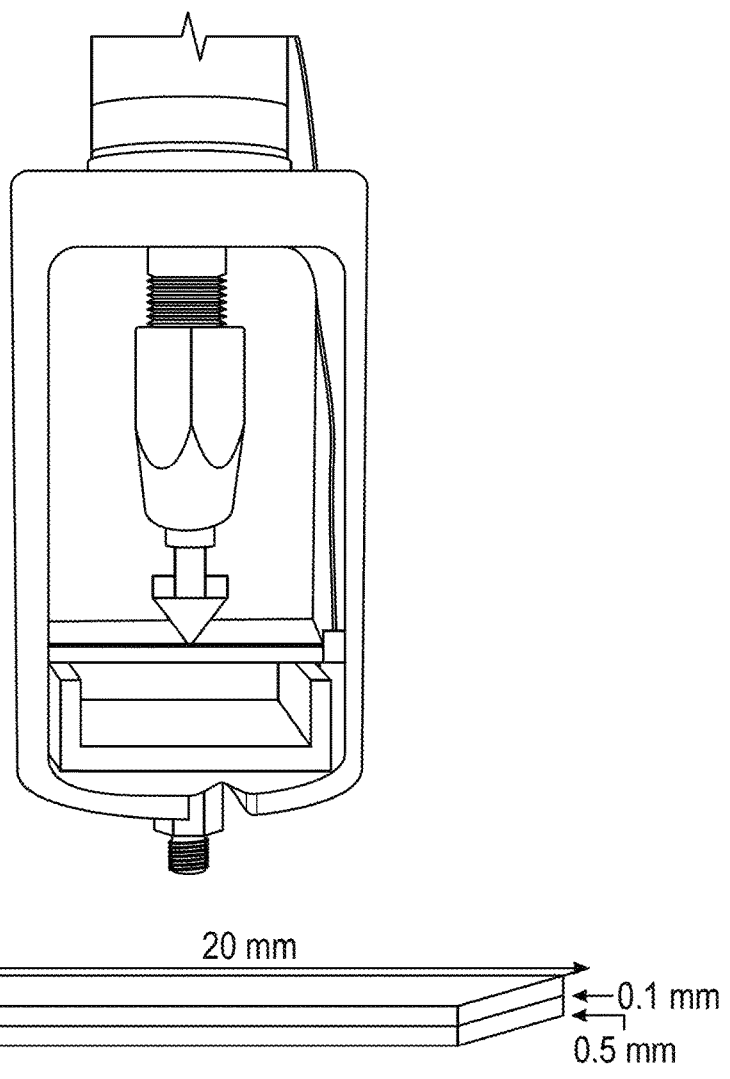

Bradford M. 1976. A rapid and sensitive method for the quantitation of microgram quantities of protein utilizing the principle of protein-dye binding. Anal Biochem 72: 248-254.

Nasseri A., Rasoul-Amini, Morowvat M., Ghasemi Y. 2011. Single Cell Protein: Production and Process. American Journal of Food Technology, 6(2): 103-116.

Paéz G., Jiménez E., Mármol Z., Ferrer J., Sulbarán B., Ojeda G., Araujo K., Rincón M. 2008. Perfil de aminoácidos de la proteína unicelular de la *Kluyveromyces marxianus* var. *Marxianus*. Interciencia, 33(4): 297-300.

ASTM D2339. 2011. Standard Test Method for Strength Properties of Adhesives in Two-Ply Wood Construction in Shear by Tension Loading. Book of Standards 15.06.

ASTM D1183. 2011. Standard Practices for Resistance of Adhesives to Cyclic Laboratory Aging Conditions. Book of Standards 15.06.

Norma Europea UNE 120. 1994. Tableros de partículas y fibras de madera. Determinación del contenido de formaldehído. Método de extracción denominado del perforador.

Norma Europea UNE 317. 1994. Tableros de partículas y fibras de madera. Determinación de la hinchazón del espesor después de inmersión en agua.

Norma Europea UNE 319. 1994. Tableros de partículas y fibras de madera. Determinación de la resistencia a la tracción perpendicular a las caras del tablero.

Norma Europea UNE 322. 1994. Tableros de partículas y fibras de madera. Determinación del contenido de humedad.

Norma Europea UNE 323. 1993. Tableros de partículas y fibras de madera. Determinación de la densidad.

ISR to the corresponding PCT case, PCT/CL2016/000065, English Translation.

1st Office Action (OA1) to the CL priority Patent Application, CL221503255 filed Nov. 5, 2015.

Nuñez M et al Evaluation of singles cell protein from yeast for the development of wood adhesives. European Journal of wood and wood products. Nov. 2016, 74(6):821-828.

Kadimaliev D et al Optimization of the conditions required for chemical and biological modification of the yeast waste from beer manufacturing to produce adhesive compostiions Bioresources, 2012 7(2):1984-1993. DOI: 10.15376/biores. 7.2.1984-1993.

\* cited by examiner

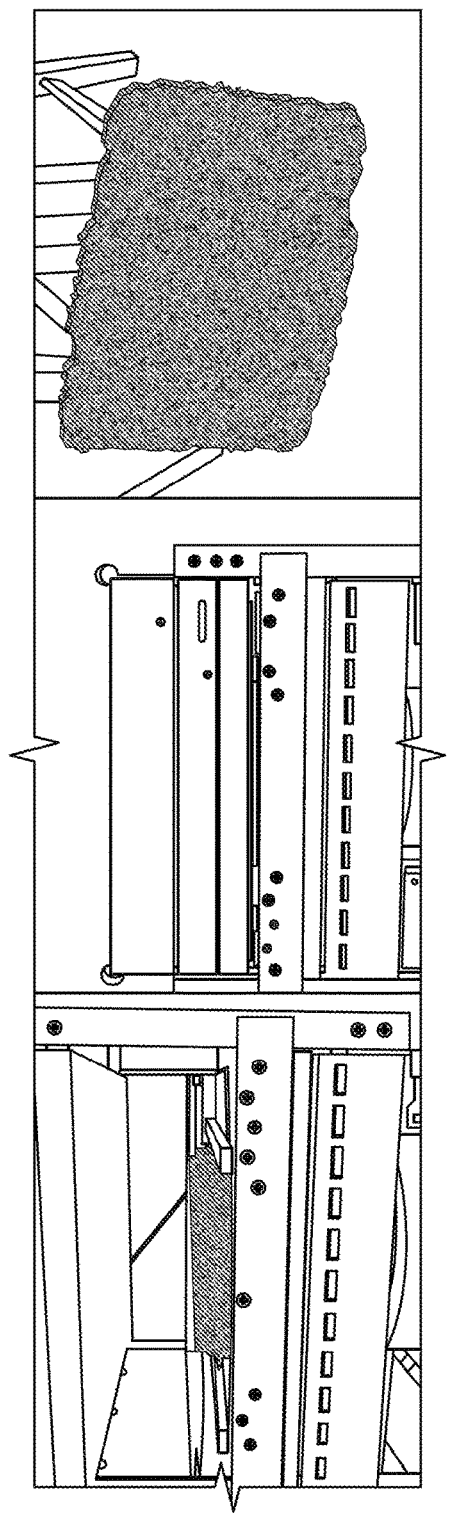

YEAST-BASED ADHESIVE EXTRACT, COMPOSITION AND METHOD

FIELD OF THE INVENTION

The present invention relates to the area of wood adhesives of biological origin, their method of preparation and use.

I. PURPOSE OF THE INVENTION

The present application is directed to adhesive compositions of biological origin wood, method of production and use. To develop the compositions extract unicellular yeast protein (PUL) was used from *Rhodotorula rubra* yeast, *Saccharomyces cerevisiae* and *Pichia pastoris*. Adhesive solutions were characterized by its protein content, amino acid composition analysis and studied by dynamic thermomechanical generated. Overlapping plywood joints with adhesive solutions were manufactured and performance adhesives were evaluated by mechanical tests. Wood particle board was fabricated and their physical, mechanical and formaldehyde emission were evaluated. Adhesives based extract PUL are formaldehyde and other volatile organic compounds in the composition are therefore friendly with the environment and the health of people.

INTRODUCTION

The main adhesives used in industry wood panels in recent decades have been urea-formaldehyde and phenol-formaldehyde. These adhesives are formulated based on raw materials from fossil fuels, natural gas and oil. The finite availability of these raw materials and restrictions on emissions of volatile organic compounds (VOCs) have limited useful of formaldehyde adhesives (Athanassiadou 2009). This has promoted the use of natural raw materials and sustainable origin in the manufacture of adhesives, the main sources lignin, tannins and proteins (Pizzi 2006, Van Langenberg et al. 2010, Winterowd 2006).

Proteins have been used to make adhesives for centuries, but low resistance to moisture and temperature limited its use. In the last decade, the introduction of new additives chemical proteins has yielded adhesives with better strength properties. Currently, the major development of protein-based adhesives used in soy flour, soy concentrate and soy isolate. Among the additives used with soy proteins are sodium hydroxide, urea, isocyanate, aldehydes and polyethylenamine (Huang et al. 2008, Lee et al. 2006, Liu et al. 2002, Westcott et al. 2009, Westwood et al. 2007).

Because of the above drawbacks, there is a need for new adhesives that are sustainable for use in wood. The present invention aims to obtain an adhesive from the use of unicellular protein from yeast biomass (PUL) that can be used in wood. This protein provides a number of advantages over vegetable proteins. The technology for large scale production of microorganisms, particularly yeast, is resolved. Their growth requirements are easily implemented and having a high production rates, allowing the generation of large volumes in industrial processes using bioreactors. Its production is independent of stationary or climatic factors given the system of continuous production and low pollution, allowing the maintenance of stable production levels unlike grain proteins that depend on the weather and semiannual or annual rotations. Reduced production plants compared to large areas of crop plantations generators require grains protein (Adedayo et al. 1 201, 2004 Chacon, et al Dharumadurai 2011, Giraldo et al. 2012) are needed.

The present invention allows for the characteristics of the protein extracts of yeast cell protein (PUL) *Rhodotorula rubra, Saccharomyces cerevisiae* and *Pichia pastoris*, are suitable for making adhesives. Using extracts PUL in the manufacture of wood adhesives validated. Adhesives based extract PUL are formaldehyde and other volatile organic compounds in its composition so are sustainable and friendly to the environment and the health of people.

II. BACKGROUND OF THE INVENTION

State of the Art

The use of synthetic adhesives industry wood composite panels have been conditioned due to new regulations limiting the levels of formaldehyde emission. This has restricted the use of urea-formaldehyde (UF). This has promoted research and development of adhesives based on sustainable, raw materials friendly to the environment and health of people. The use of vegetable protein from soybean meal and wheat have been investigated in recent years, but the incorporation of high levels of chemical additives and the requirements of these proteins for human and animal consumption, has limited use.

In addition to adhesives based on vegetable protein, in the prior art and are related to the development of biological origin adhesives documents. For example, the document US20100258033 A1 discloses an adhesive for wood containing (among other things) 3 to 45 parts by weight of a proteinaceous material. U.S. Pat. No. 7,651,582B2 describes a method for producing an adhesive for wood which is composed of waste materials from the fermentation of cellulosic substrates with glycocalyx-producing microorganism. Among these microorganisms the *Clostridium* species *Ruminococcus* and described. Therefore, this application differs from the application in question and does not mention yeast proteins obtained.

III. SUMMARY OF THE INVENTION

In the present invention an extract of yeast cell protein (PUL) to obtain adhesives usable in wood, for this purpose *Rhodotorula rubra* yeast, *Saccharomyces cerevisiae* and *Pichia pastoris* dealt develops. Protein content, amino acid composition and molecular weight distribution of the protein extracts was determined. Adhesive solutions were characterized and studied by dynamic analysis thermomechanical were generated. Overlapping plywood joints with adhesive for mechanical testing and evaluating the performance of adhesives were made solutions. The *Rhodotorula rubra* protein extract contains 72.4% protein, 71.0% *Pichia pastoris* and 64.6% *Saccharomyces cerevisiae*. The amino acid composition of the extract samples PUL content favors the functional groups reactive with the groups present in the polymers of the wood. The results of thermomechanical analysis showed that adhesive PUL extract solutions have adequate performance to promote adhesion to wood. The bond strength in dry condition with adhesives based on PUL extract varied between 2.40 and 2.99 MPa, comparable to those obtained with UF values and an adhesive based on soy isolate flour, highly concentrated. Finally, through the present invention use PUL extract as raw material for the development and manufacture of wood adhesives is validated.

IV. BRIEF DESCRIPTION OF THE FIGURES

FIG. 1: Analysis Dynamic thermomechanical testing by 3-point bending two sheets of wood adhesive solution in the center.

Figure 2:
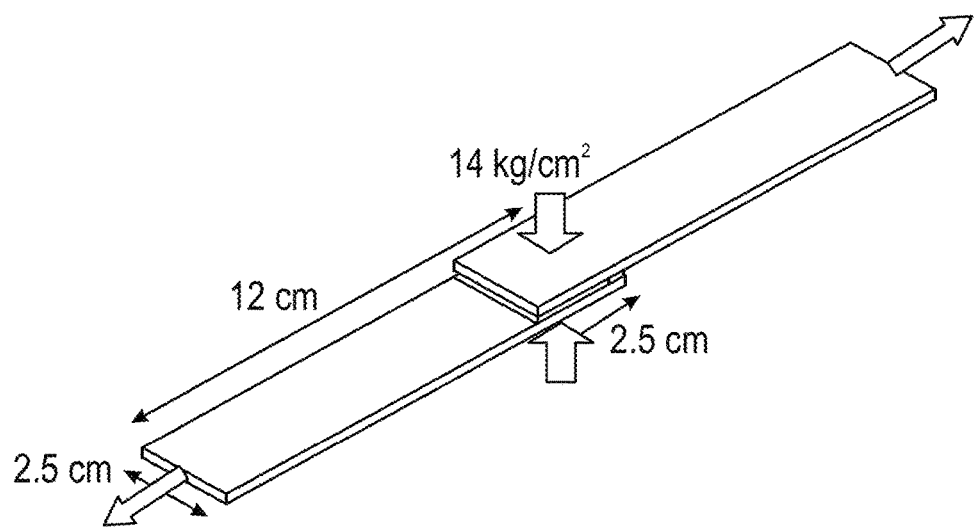

FIG. 2: Shear Assay will tensile overlapping joints wood *Pinus radiata* D.DON and adhesive solutions based on unicellular yeast protein.

Figure 3:
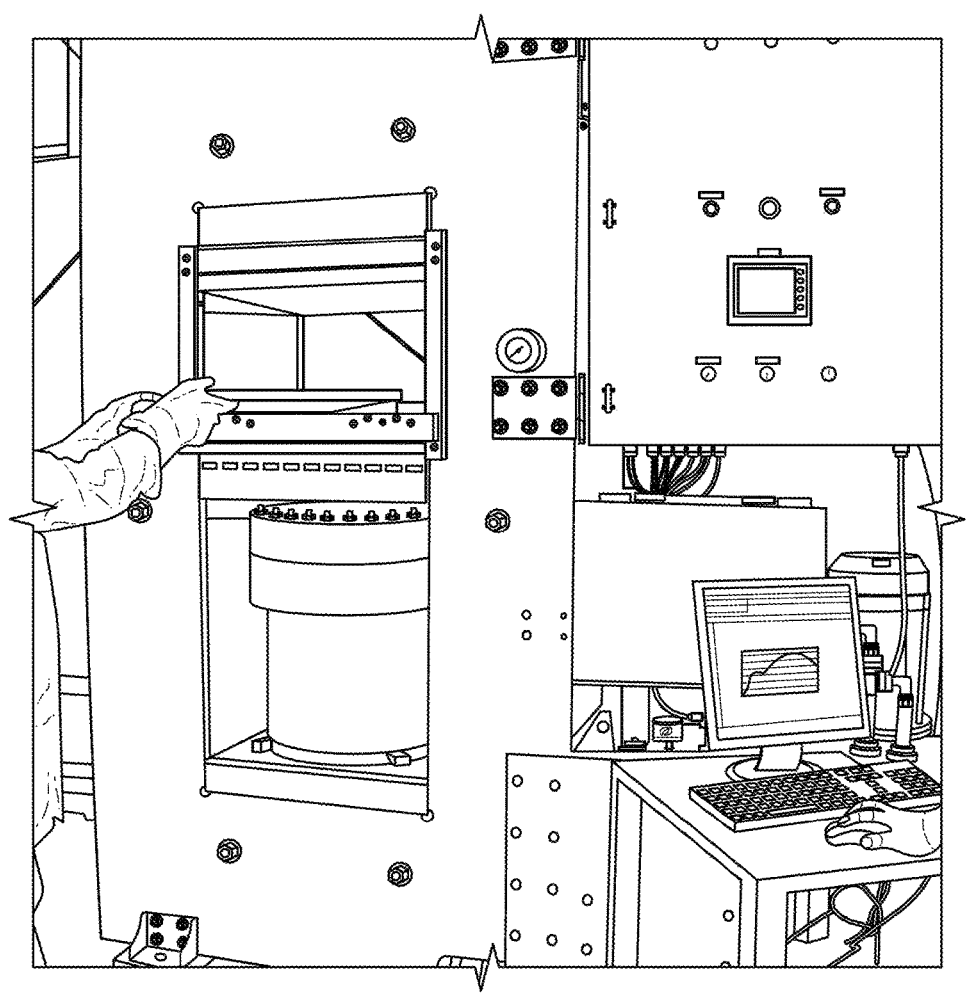

FIG. 3: Images of the reference board manufacturing process of particles.

FIG. 4: Images of the reference pressing process of the particleboard (PB).

V. DETAILED DESCRIPTION OF THE INVENTION

The present invention relates to a yeast protein extract with adhesive properties, which consists of combination of extracts of *Rhodotorula rubra*, *Saccharomyces cerevisiae* and *Pichia pastoris*. In a preferred embodiment, the yeast protein extract with adhesive properties, each extract includes yeasts *Rhodotorula rubra* of *Pichia pastoris* and *Saccharomyces cerevisiae* in a ratio of 1:1:1.

*Rhodotorula rubra* addition yeasts. *Saccharomyces cerevisiae* and *Pichia pastoris* are deposited in the Chilean Collection MGRs (CChRGM) with deposit numbers: RGM2246, RGM2264 and RGM2245 respectively.

The present invention in a further aspect relates to an adhesive composition for wood panels, comprising the yeast protein extract stated above.

In a preferred embodiment, the adhesive composition for wood panels, is in the form of aqueous solution, preferably at a concentration between 10-60%, more preferably 20 to 50%, more preferably contains 35% w/v yeast protein extract with adhesive properties.

A further aspect of the present invention relates to the process for preparing said protein extract based on:
- providing biomass crops comprising yeast *Rhodotorula rubra* each, *Saccharomyces cerevisiae* and *Pichia pastoris*, respectively,
- single mechanical grinding of biomass of each yeast strain,
- separation and removal of the liquid phase of each individual grinding the previous step,
- liofilización individual liquid phases obtained in the previous step for each strain,
- combining equal amounts of each individual lyophilized to obtain the adhesive protein extract.

Also comprising the present invention the preparation of the adhesive composition for wood panels. Where the wood panels are selected from the group consisting of fiberboard, particleboard (PB), medium density fiber (MDF) and medium density particle (MDP).

Another aspect of the invention relates to the use of the adhesive composition for wood panels, particularly for the attachment of any type of wood panels, preferably those selected from the group consisting of fiberboard, particleboard (PB), medium density fiber (MDF) and medium density particle (MDP).

The characteristics of extracts unicellular yeast protein *Rhodotorula rubra*, *Pichia pastoris* and *Saccharomyces cerevisiae* favors the use of its proteins in the development of adhesives, since they have a high protein content, a distribution of molecular weight allows for adhesives low viscosities compared to adhesives based on plant proteins to the same solids content, and an amino acid composition which provides a high percentage of associated functional groups to the side chains of amino acids can react with the functional groups available on the wood polymers.

The results of thermomechanical tests and dynamic shear strength of joints made with adhesives PUL extracts valid use as wood adhesives. These results were compared to those obtained with adhesives based on flour soy isolate, which has been concentrated and purified to be used as an adhesive by various processes with chemical additives, unlike extracts based PUL have only required a process of cell lysis and separation without requiring any manipulation or modification of proteins.

It is estimated that it is likely to improve the performance of wood joints with adhesives PUL extracts, by modifying their proteins and/or by incorporating other additives that favor the properties of adhesives. It is also estimated that these adhesives can be used in plywood, flakeboards, oriented strand boards, particleboards and fiberboards. Currently he is working on the aforementioned issues.

VI. EXAMPLES

Example 1: Cultivation of Microorganisms and Production of Extract 1.1 Materials.

They were used for the production of yeast biomass *Rhodotorula rubra*, *Pichia pastoris* and *Saccharomyces cerevisiae*, for its rapid growth rate and easy production, cultured in medium "Yes" conditioned Agar, existing in the Laboratory of Synthesis and Biotransformation of Natural Products of Bio Bio University. As pattern was used flour from soy 85% protein (ProCote DUPONT) and a commercial urea formaldehyde resin with 65% solids, viscosity of 300 cP and a pH of 7.5 provided by the company Masisa (Chile). RGM2246, RGM2264 and RGM2245 respectively: *Rhodotorula rubra* yeast, *Pichia pastoris* and *Saccharomyces cerevisiae* are deposited in the Chilean Collection MGRs (CChRGM) with deposit numbers were used in this assay.

1.2 Production of Biomass and Protein Extract.

Biomass production was carried out based on yeast cultures (*Rhodotorula rubra*, *Saccharomyces cerevisiae* and *Pichia pastoris* with the deposit numbers: RGM2246, RGM2264 and RGM2245 respectively) in liquid media standardized laboratory, rich in carbohydrates. The media were prepared in 4 liter batch distributed in 10 Erlenmeyer flasks of 1 liter. The medium consisted of a mixture of yeast extract (16 g), sucrose (80 g), potassium acid phosphate (4 g), hydrous magnesium (2 g) sulfate, corn steep liquor (20 g) and water distilled. The medium was autoclaved at 124° C. and 1 25 kg/cm$^2$ for 15 minutes. Inoculation of the yeast in the medium was performed under reflux bell and to flame burner (Davoli et al. 2009, Madigan et al. 2003). Subsequently, the flasks were placed under stirring at 100 rpm for 72 hours. The biomass was separated from the supernatant liquid medium by centrifugation at 5000 rpm for 10 minutes at 20° C.

Extraction unicellular yeast protein was performed by the method of mechanical destruction of cells with the aim of maximizing the extraction process, using a mortar, sea sand and a phosphate buffer. The mixture was centrifuged at 5000 rpm for 10 minutes at 20° C. separated the supernatant solution which contains the proteins of the protein extracts from cell debris and sand (Whitford 2005). The supernatant solution was lyophilized to obtain the protein extract.

1.3 Evaluation of the Protein Content.

Protein content was determined by the Bradford method, using a spectrophotometer UV2310 Techcomp to measure the absorbance of each sample at 595 nm, the calibration curve prepared with bovine serum albumin protein (Bradford 1976). Based on 50 mg of each protein extract solutions they were prepared at 10% w/v in deionized water determination to perform.

Results

Protein content, amino acid composition and molecular weight of the protein extract of yeast.

The *Rhodotorula rubra* protein extract contains 72.4% protein, contains 71.0% *Pichia pastoris* and contains 64.6% *Saccharomyces cerevisiae*. These values are higher than those found in a normal yeast biomass and reflect the advantage of the process of cell lysis and separation of the protein extract to increase the protein content in the sample. These values are higher than those reported in flours and similar to normal flour present in concentrated soy level (Nasseri et al. 2011 Westcott et al. 2009).

Table No. 1 details the amino add composition of the extract samples PUL with protein flour soy isolate.

TABLE NO 1

Amino acid composition of unicellular yeast protein flour and isolated soy (g/100 g protein).

| | Samples | | | |
|---|---|---|---|---|
| Amino Acid* | *Rhodotorula rubras* | *Pichia Pastoris* | *Sacharomyces cervisiae* | Flour of soy isolatate |
| Aspartic acid/Asparagine | 11.7 | 13.3 | 10.9 | 11.3 |
| Glutamic acid/Glutamine | 15.0 | 11.5 | 11.3 | 18.1 |
| Alanine | 7.7 | 8.0 | 7.2 | 5.9 |
| Arginine | 4.4 | 3.5 | 3.6 | 5.6 |
| Cysteine | — | — | — | 0.7 |
| Phenylalanine | 4.0 | 5.2 | 5.5 | 4.0 |
| Glycine | 7.4 | 5.5 | 5.6 | 7.0 |
| *Histidine* | *3.0* | *3.0* | *3.1* | *2.2* |
| Isoleucine | 5.1 | 5.9 | 6.1 | 4.7 |
| Leucine | 9.1 | 8.9 | 10.1 | 8.5 |
| *Lysine* | *4.9* | *5.0* | *3.0* | *5.5* |
| *Methionine* | *1.9* | *2.3* | *2.5* | *1.1* |
| Proline | 6.7 | 4.5 | 5.3 | 6.3 |
| Serine | 4.6 | 6.0 | 6.5 | 6.3 |
| Tyrosine | 3.0 | 2.9 | 3.0 | 2.6 |
| *Threonine* | *4.9* | *7.2* | *8.0* | *4.0* |
| Triptophane | — | — | — | 0.9 |
| Valine | 6.0 | 7.3 | 8.2 | 5.2 |

*Aminoácids with side chain functional groups that can react with the wood (marked with bold and italic).

The percentage of amino acid side chains include hydroxyl groups (—OH), amine (—NH—) and carboxyl (—COOH), with the ability to react with the groups present in the timber and promote good adhesion was 58.1% for *Rhodotorula rubra* extract, 56.9% for *Pichia pastoris* and 54.8% for *Saccharomyces cerevisiae*. The main amino acids with these groups are tyrosine, threonine, arginine, histidine, lysine, aspartic acid and glutamic asparangine-glutamine acid. The percentage of amino acids with sulfhydryl side chains includes groups (—SH), with the ability to maintain the internal structure of the protein, it was 1% to 0.9% *Rhodotorula rubra* extract, 2.3% for *Pichia pastoris* and 2.5% to *Saccharomyces cerevisiae*. The amino acid present with this side group was methionine. Amino acids that do not have reactive functional groups in their side chain have apolar aliphatic groups involved in the adhesion process as hydrophobic compounds in line adhesive bonding.

In general, the amino acid percentage composition of the protein extract from *Rhodotorula rubra* was similar to flour soy isolate, which was concentrated and purified by various chemical processes, while the protein extract was obtained by a process of cell lysis and separation. The amino acid composition by extracts *Saccharomyces cerevisiae* and *Pichia pastoris* was similar to that reported for *Kluyveromyces marxianus* unicellular protein and *Candida utilis* (Paez et al. 2008).

Example 2: Preparation and Evaluation of Adhesive Strength Adhesive Joints with Wood Solutions 2.1.—Preparation and Characterization Adhesive Solutions.

20 g of each protein extract were diluted in distilled water to obtain adhesive each separately three extracts to 35% w/w solutions. Each solution was stirred for 15 minutes at room temperature.

A mixture of three protein extracts in equal proportions was also prepared by mixing 7 g of each extract in distilled water to obtain an adhesive solution 35% w/w, which was stirred for 15 minutes at room temperature.

The pH was characterized by Hanna Instruments pH meter digital HI 111, the viscosity by a Brookfield LV and the solids content by 2 hours in an oven at 120° C. An adhesive solution with soy flour 25% w/w was also prepared for use as a standard for comparison with a commercial resin of urea-formaldehyde.

In the Table No. 2 results properties of adhesive solutions are presented.

TABLE NO. 2

Properties of adhesive solutions.

| Adhesive Solution | Solid Content (%) | Viscosity at 25° C. (cP) | pH at 25° C. | Content of water (%) |
|---|---|---|---|---|
| *Rhodotorula rubra* | 35.08 | 205 | 4.27 | 64.92 |
| *Pichia pastoris* | 35.03 | 190 | 5.01 | 64.97 |
| *Saccharomyces cerevisiae* | 34.86 | 180 | 5.20 | 65.14 |
| Mixture 3 protein extracts | 34.89 | 196 | 4.76 | 65.11 |
| Isolated soy meal | 24.93 | 950 | 5.56 | 75.07 |
| Urea Formaldehyde | 64.89 | 305 | 7.53 | 35.11 |

Table 2 shows that the viscosity of solutions of extracts PUL are less than the viscosity of the adhesive based on soy flour isolated with a higher solid content. The pH of the solutions ranged from 4.27 PUL and 5.20, less than 5.56 of the solution of soybean flour and isolated UF 7.53. The UF had a viscosity of 305 cP and a solids content of 64.89%, optimal for manufacturing wooden chipboard conditions. The lower molecular weight of protein extracts PUL would increase the solids content while maintaining low viscosity unlike flour soy isolate which does not allow to increase the solids content without increasing viscosity to levels which hinder its applicability.

It is an advantage that adhesives based on protein extract allow to obtain low viscosity compared to the flour soy isolate, higher concentrations (solid content). This allows less water in the system while a lower viscosity urea formaldehyde, which allows to establish the concentration and viscosity at levels similar to those that have urea formaldehyde could be increased. This is an advantage if the objective is the replacement of urea formaldehyde in the manufacture of particleboard and fiberboard.

Dynamic Thermomechanical Analysis of Wood Adhesive Composite.

It was measured stiffness of the adhesive solution and the wood function of temperature using a dynamic thermomechanical lifting anal, Perkin Elmer DMA 7e, under the modality of a bending test of three points. Spring wood *Pinus radiata* D.DON was used. It is was bound two sheets of 0.5 mm thick, 4 mm wide and 20 mm long, with 30 mg of a light adhesive solution and assay of 1 to 5 mm (FIG. 1). The assemblies were subjected to a test is not isothermal temperature between 25° C. and 200° C., with a heating rate of 10° C./min at a test frequency of 1 Hz. The storage modulus was monitoring throughout the test.

Thermomechanical Analysis of the Adhesive Solution.

The results of the storage modulus curves of the dynamic test thermomechanical adhesives, presented three areas characteristics according to temperature level (data not shown). At the beginning decreased modulus caused by the plasticizing effect of the water present in the system. Then, an increased modulus due to increased product stiffness system adhesive and adhesive-wood adhesive interaction. Finally, the high stiffness of the system of polymerization of the adhesive is reached. Finally, the modulus tends to remain constant or decreases slightly.

The UF was the one with the highest modulus and the increase started at the lower temperature, compared to the other samples. Therefore, the sample was presented the highest level of stiffness and reactivity function of temperature. The storage modulus of the UF began to increase 40° C. reaching 3.7 GPa at 115° C.

Adhesives based on flour extract PUL and isolated soy had a behavior similar storage modulus in the temperature range of the assay. The modulus decreased reaching a minimum value between 60 and 70° C. Subsequently, the modulus began to increase. The lower value of the storage modulus was 0.25 GPa and presented the meal sample isolated soy, which had the highest water content (75.07%). The higher storage modulus was reached between 125 and 140° C. with stiffness values between 2.1 and 2.4 GPa.

Adhesives based extract PUL promote increased stiffness systems in the presence of wood like UF and based adhesive flour isolated soy, indicating that promotes interaction adhesive-adhesive and adhesive-wood.

2.3.—Evaluation of Shear Strength of the Adhesive.

The performance of the bond between the adhesive and wood under load was evaluated by a tensile test by generating a shear failure of joints overlapping veneer 3 mm thick according to ASTM D2339. Resistance shear moisture was evaluated preconditioning the specimens by immersion in water for 48 hours at 23° C. according to the methods of ASTM D1183. The test was 1 weighed out by a testing machine universal Instron 4468 with a crosshead speed of 10.6 mm/min. The maximum load was recorded, plates 3 mm thick *Pinus radiata* DDON 350 mm width (perpendicular to fiber direction) were used per 120 mm long (parallel to the fiber direction) to generate overlapping joints 25 mm long. The wood density was 450 kg/m$^3$ and the moisture content on a dry basis was 10%. These unions specimens 25 mm wide were extracted with a test area of 625 mm$^2$ (FIG. 2). Joints by applying 100 g/m$^2$ of adhesive solution on a dry basis, which were pressed for 180 seconds, using a pressure of 14 kg/cm$^2$ were fabricated. Is utilized three pressing temperatures to 120° C., 150° C. and 180° C. Samples were subsequently conditioned at 20° C. and 50% relative humidity for 48 hours before being tested 10 specimens were tested for each sample and conditioning.

In Table No. 3 results in the average shear strength under dry and wet condition of joints made with protein extracts three low pressing temperatures are presented

TABLE NO. 3

Shear strength average joints overlapping veneer with adhesives based on protein extract of yeast, soy flour and isolate urea formaldehyde manufactured with different pressing temperatures. *

| Adhesive Solution | Resistance under dry condition (MPa) | | | Resistance under wet condition | | |
|---|---|---|---|---|---|---|
| | 180° C. | 150° C. | 120° C. | 180° C. | 150° C. | 120° C. |
| *Rhodotorula rubra* | 2.99$^b$ | 2.84$^{bc}$ | 2.67$^{cd}$ | 1.40$^h$ | 1.06$^{jk}$ | 0.86$^{klm}$ |
| *Pichia pastoris* | 2.54$^{de}$ | 2.57$^{de}$ | 2.28$^t$ | 1.13$^{ij}$ | 0.99$^{jklm}$ | 0.77$^{lm}$ |
| *Saccharomyces cerevisiae* | 2.40$^{ef}$ | 2.37$^{ef}$ | 2.17$^t$ | 1.06$^{jk}$ | 0.99$^{jkl}$ | 0.75$^m$ |
| Mixture 3 protein extracts | 3.45$^a$ | 3.21$^{ab}$ | 3.13$^b$ | 1.49$^h$ | 1.35$^{hi}$ | 0.91$^{kl}$ |
| Isolated soy meal | 3.01$^b$ | 2.97$^b$ | 2.64$^{cd}$ | 1.39$^h$ | 1.34$^{hi}$ | 1.03$^{jk}$ |
| Urea Formaldehyde | 3.60$^a$ | 3.63$^a$ | 3.52$^a$ | 1.73$^g$ | 1.71$^g$ | 1.70$^g$ |

* Average based on n = 10. lyrics superscripts significant differences reflect the LSD test with confidence interval 95%. Statgraphics Centurion software XVII.

The results of shear strength in dry condition are significantly higher than those obtained in wet condition due to the effect of water weakens the interface wood-adhesive and cohesion of the adhesive. The presence of water causes disruption of the hydrogen bonds present in bridge wood adhesive and adhesive-adhesive interface, weakening adhesive bonding. Strength loss varied between 50% and 70% relative resistance in dry condition. The results of shear strength were significantly higher for the pressing temperature of 180° C. The lower resistance results were obtained for 120° C., which is due to the lack of consolidation of the joints.

The results of shear resistance were significantly higher than those achieved with adhesives of *Rhodotorula rubra* extract flour and isolated soy, including no differences. The lower results were obtained with adhesive extracts of *Pichia pastoris* and *Saccharomyces cerevisiae*. The mixture of the three extracts the adhesive solution was obtained the best results, resembling those obtained with urea-formaldehyde. In dry condition and a temperature of 180° C., the bond strength with UF was 3.6 MPa, for adhesives extract of *Rhodotorula rubra* flour and soy isolate was 2.99 and 3.01 MPa, and adhesive extract of *Pichia pastoris* and *Saccharomyces cerevisiae* was 2.54 and 2.40 MPa. To the mixture of the 3 extracts was 3.45 MPa.

Example 3. Preparation of Adhesive Solutions and Validation by Manufacturing and Evaluation of Mechanical Physical Properties of the Particleboards Preparation and Characterization Adhesive Solutions.

It is diluted 200 g of each protein extract in distilled water to obtain adhesive solutions each of the three separate extracts 50% w/w. Each solution was stirred for 15 minutes at room temperature.

A mixture of three protein extracts at the same proportions was also prepared by mixing 70 g of each water in distilled water to obtain an adhesive solution 50% w/w, which was stirred for 15 minutes at room temperature.

The pH was characterized by Hanna Instruments pH meter digital HI 111, the viscosity by a Brookfield LV and the solids content by 2 hours in an oven at 120° C. An adhesive solution with soy flour 25% w/w was also prepared for use as a standard for comparison with a commercial urea-formaldehyde resin.

TABLE NO. 4

Properties of adhesive solutions.

| Adhesive Solution | Solid Content (%) | Viscosity at 25° C. (cP) | pH at 25° C. | Content of water (%) |
|---|---|---|---|---|
| Rhodotorula rubra | 50.86 | 490 | 4.31 | 49.14 |
| Pichia pastoris | 49.97 | 410 | 5.12 | 50.03 |
| Saccharomyces cerevisiae | 50.09 | 380 | 5.14 | 49.91 |
| Mixture 3 protein extracts | 49.93 | 450 | 4.81 | 50.07 |
| Isolated soy meal | 24.93 | 950 | 5.56 | 75.07 |
| Urea Formaldehyde | 64.89 | 305 | 7.53 | 35.11 |

Production and Evaluation of Wood Particteboards.

Particleboard *Pinus radiata* D DON 10 mm thickness and area 200×200 mm$^2$ (FIG. 3) were produced. The boards were made with thin and thick evenly mixed with adhesive particles. The boards are put together with three layers of wood particles, two surface layers of fine material, size range 0.4 to 2 mm and a central layer of coarse material, size range 2 to 10 mm. Wood particles were dried in an oven with air circulation at 103° C. up to a moisture content on a dry basis was less than 3%. The reason sizing mass ratio of solid adhesive to the mass of dried wood particles, was 10% for fine and coarse material. 128 g of coarse dry particles were mixed with 25.6 g of adhesive 50% w/w. 128 g of fine dry particles were mixed with 25.6 g of adhesive 50% w/w. The pressing process takes 250 seconds using a temperature of 180° C. and specific pressures on the mattress particles 30, 15 and 5 kg/cm$^2$. In the case of boards made with flour isolated soy pressing time was 600 seconds, due to the larger amount of water having the adhesive. 7 boards were manufactured for each adhesive.

Evaluation of Mechanical and Physical Properties and Emission of Particleboard.

The physical, mechanical and formaldehyde emission properties from particleboard according to European standards Normative (EN) were evaluated. Properties moisture content (EN 322), density (EN 323), swelling in thickness after immersion in water (EN 317), tensile strength perpendicular to the faces of the board (EN 319 were evaluated) determination and formaldehyde content (EN 120).

TABLE NO. 5

Properties of particleboard.

| Adhesive Solution | Moisture content (%) | Density (kg/m$^3$) | Swelling at 24 hours | Perpendicular tensile strength (N/m$^2$) | COH2 emission (mg/100 g) |
|---|---|---|---|---|---|
| Rhodotorula rubra | 6.3 | 693 | 35 | ND | 0.2 |
| Pichia pastoris | 6.7 | 710 | 41 | 0.33 | 0.2 |
| Saccharomyces cerevisiae | 5.9 | 678 | 43 | 0.29 | 0.2 |
| Mixture 3 protein extracts | 5.8 | 694 | 34 | 0.39 | 0.2 |
| Isolated soy meal | 6.2 | 697 | 51 | 0.38 | 0.2 |
| Urea Formaldehyde | 5.9 | 685 | 34 | 0.39 | 6.8 |
| European Normative Requiriment | 5-11 | 680-720 | ≤35 | ≥0.39 | ≤8 |

Regarding to the moisture content and density particle board (PB, acronym particleboard), all showed levels within the required and similar to that presented by the board manufactured with the adhesive urea-formaldehyde (UF) range.

Tensile strength perpendicular PB manufactured UF, *Rhodotorula rubra*, the mixture of the three protein extracts and flour isolated soy meets the requirements of the regulations, but not the PB manufactured with adhesives of *Pichia pastoris* and *Saccharomyces cerevisiae*. PB swelling made UF, *Rhodotorula rubra* and mixing the three protein extracts meets the requirements of the regulations, but not the PB manufactured with adhesives of *Pichia pastoris*, *Saccharomyces cerevisiae* and soy flour isolate.

All PB fulfilled the requirements of formaldehyde emission, noting that in the PB formaldehyde emission level is significantly lower than with UF. On the other hand, it can indicate that all PB fulfilled because the requirement is for an EI level required by European regulations 8 mg/100 g. If he had compared to the E0 level of 5 mg/100 g, the PB with UF would not have met.

We claim:

1. A yeast protein extract with adhesive properties, the yeast protein extract comprising a combination of *Rhodotorula rubra*, *Pichia pastoris* and *Saccharomyces cerevisiae* extracts.

2. The yeast protein extract with adhesive properties according to claim 1, wherein *Rhodotorula rubra* yeast, *Saccharomyces cerevisiae* and *Pichia pastoris* are deposited in the Chilean Genetic Resources Collection Microbial (CChRGM) with deposit numbers: RGM2246, RGM2264 and RGM2245 respectively.

3. The yeast protein extract with adhesive properties according to claim 2, wherein the extracts of yeasts *Rhodotorula rubra*, *Saccharomyces cerevisiae* and *Pichia pastoris* are in a mass ratio of 1:1:1.

4. The yeast protein extract with adhesive properties according to claim 1, wherein the extracts of yeasts *Rhodotorula rubra*, *Saccharomyces cerevisiae* and *Pichia pastoris* are in a mass ratio of 1:1:1.

5. An adhesive composition for wood panels comprising a combination of *Rhodotorula rubra*, *Pichia pastoris* and *Saccharomyces cerevisiae* extracts.

6. The adhesive composition for wood panels according to claim 4, wherein such extracts are extracts of *Rhodotorula rubra* of accession number RGM2246 of the Chilean Genetic Resources Collection Microbial (CChRGM), *Pichia pastoris* accession number RGM2264 of the Chilean Genetic Resources Collection Microbial (CChRGM) and

*Saccharomyces cerevisiae* accession number RGM2245 of the Chilean Genetic Resources Collection Microbial (CChRGM).

7. The adhesive composition for wood panels according to claim 6 wherein the extracts of yeasts *Rhodotorula rubra*, *Saccharomyces cerevisiae* and *Pichia pastoris* are in a mass ratio of 1:1:1.

8. The adhesive composition for wood panels, according to claim 5, wherein the adhesive composition for wood panels is an aqueous solution that has a viscosity less than 305 cP (25° C.).

9. The adhesive composition for wood panels according to claim 5 wherein the extracts of yeasts *Rhodotorula rubra*, *Saccharomyces cerevisiae* and *Pichia pastoris* are in a mass ratio of 1:1:1.

10. A process to prepare a yeast protein extract with adhesive properties wherein the yeast protein extract comprises a combination of *Rhodotorula rubra*, *Pichia pastoris* and *Saccharomyces cerevisiae* extracts, the method comprising the steps of providing biomass crops comprising each of *Rhodotorula rubra*, *Pichia pastoris* and *Saccharomyces cerevisiae*, respectively;

singe mechanical grinding of biomass of each yeast strain;

separation and removal of the liquid phase of each individual grinding the previous step;

lyophilisation of individual liquid phases obtained in the previous step, for each strain; and combining equal amounts of each individual lyophilised to obtain the adhesive protein extract.

11. The process of claim 10 wherein *Rhodotorula rubra* yeast, *Saccharomyces cerevisiae* and *Pichia pastoris* are deposited in the Chilean Genetic Resources Collection Microbial (CChRGM) with deposit numbers: RGM2246, RGM2264 and RGM2245 respectively.

\* \* \* \* \*